US012566838B2

(12) United States Patent
Pimenta et al.

(10) Patent No.: US 12,566,838 B2
(45) Date of Patent: Mar. 3, 2026

(54) SCALABLE KEY TABLE

(71) Applicant: Avago Technologies International Sales Pte. Limited, Singapore (SG)

(72) Inventors: Rui Pimenta, Portishead (GB); Abbas Saadat, Quebec (CA)

(73) Assignee: Avago Technologies International Sales Pte. Limited, Singapore (SG)

( * ) Notice: Subject to any disclaimer, the term of this patent is extended or adjusted under 35 U.S.C. 154(b) by 196 days.

(21) Appl. No.: 18/478,418

(22) Filed: Sep. 29, 2023

(65) Prior Publication Data

US 2025/0111034 A1      Apr. 3, 2025

(51) Int. Cl.
*G06F 21/45*            (2013.01)
(52) U.S. Cl.
CPC .................................... *G06F 21/45* (2013.01)
(58) Field of Classification Search
CPC ....................................................... G06F 21/45
See application file for complete search history.

(56) References Cited

U.S. PATENT DOCUMENTS

| | | | | | |
|---|---|---|---|---|---|
| 7,730,545 | B2 * | 6/2010 | Milne | ...................... | G06F 21/35 |
| | | | | | 714/25 |
| 8,489,893 | B2 * | 7/2013 | Damian | ..................... | H04L 9/06 |
| | | | | | 713/193 |
| 11,238,136 | B2 * | 2/2022 | Nethery | .............. | G06F 21/6209 |
| 2008/0181412 | A1 * | 7/2008 | Acar | ......................... | G06F 21/79 |
| | | | | | 380/279 |
| 2009/0150991 | A1 * | 6/2009 | Hoey | .................. | H04L 63/0807 |
| | | | | | 726/18 |
| 2012/0278631 | A1 * | 11/2012 | Balinsky | ................. | H04L 9/088 |
| | | | | | 713/189 |
| 2014/0181985 | A1 * | 6/2014 | Mamidwar | ............. | G06F 21/10 |
| | | | | | 726/26 |
| 2023/0101220 | A1 * | 3/2023 | Park | ........................ | G06F 21/44 |
| | | | | | 726/7 |
| 2024/0048359 | A1 * | 2/2024 | Badrinarayanan | .... | H04L 9/0891 |

FOREIGN PATENT DOCUMENTS

EP          1050887 A1      11/2000

OTHER PUBLICATIONS

European Patent Office, Extended Search Report, Application No. 24202526.0, Feb. 26, 2025, 8 pages.

* cited by examiner

*Primary Examiner* — Dao Q Ho
(74) *Attorney, Agent, or Firm* — Quarles & Brady LLP

(57)                    ABSTRACT

Novel tools and techniques are provided for implementing storage of one or more keys received by a chip, and more particularly to methods, systems, and apparatuses for implementing storage of one or more keys in a storage of a first device that is external to the chip. An integrated circuit can include a circuit configured to receive at least one of a key or a request to retrieve the key and at least one of store the key in a storage of a device when the key is received or retrieve the key from the storage of the device when the request to retrieve the key is received. The first device can be external to the integrated circuit. The circuit can further be configured to control access to the key stored in the storage of the device.

18 Claims, 7 Drawing Sheets

500

702 Retrieve or request a key

704 Control access to the external storage

706 Remove or verify the additional protections

708 Unprotect the key

710 Transmit the key to decrypt an asset

700

SCALABLE KEY TABLE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing storage of one or more keys received by a chip, and more particularly to methods, systems, and apparatuses for implementing storage of one or more keys in a storage of a first device that is external to the chip.

BACKGROUND

Keys and/or key tables are often used to access (e.g., decrypt, decode, unscramble, etc.) assets (e.g., media content, audio content, gaming content, keys, certificates, licenses, or any other asset that must be protected from a non-secure source or non-secure entity, or the like) for use by one or more applications. An existing way to store a key or key table in a system-on-chip (SOC) is to store the key or key table internally. When the key or key table is stored internally, valuable resources on the chip are utilized to store the key or key table. As the need to store more keys or key tables increases, the size of the chip and amount of silicon needed to manufacture the chip increases.

Hence, there is a need for more robust and scalable solutions for implementing key or key table storage. Thus, methods, systems, and apparatuses are provided for implementing storage of one or more keys received by a chip in a storage of a first device that is external to the chip.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Figure 1:
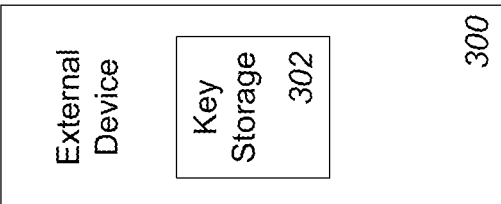
FIG. 1 is a block diagram of a system having a system-on-chip (SOC) and an external device, in accordance with various embodiments.
Figure 1:
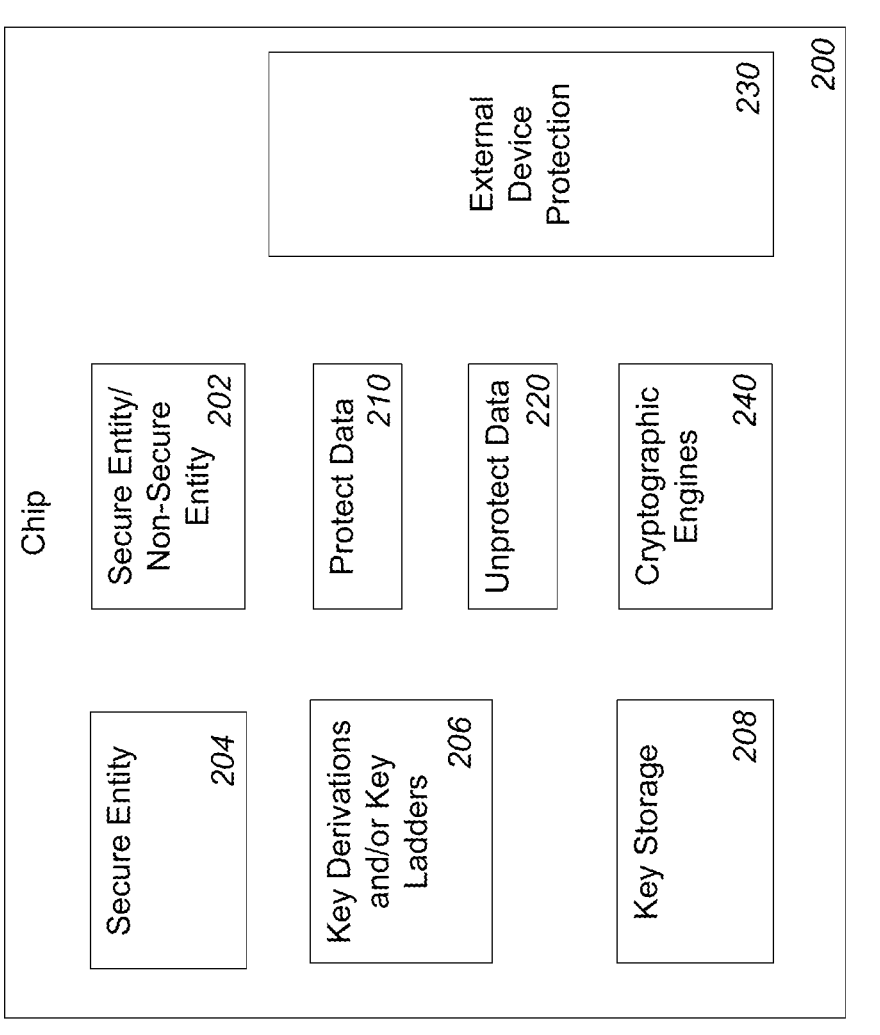

Various embodiments provide tools and techniques for implementing a storage of one or more keys or key tables. More particularly, methods, systems, and apparatuses are provided for implementing storage of one or more keys received by a chip in a storage of a first device that is external to the chip.

In a first aspect, an integrated circuit includes a first circuit configured to receive at least one of a first key or a request to retrieve the first key; at least one of store the first key in a storage of a first device in response to receiving the first key or retrieve the first key from the storage of the first device in response to receiving the request to retrieve the first key, wherein the first device is external to the integrated circuit; and control access to the first key stored in the storage of the first device.

In some cases, the first device is external the integrated circuit, but contained within the same circuit board (e.g., a printed circuit board, or the like) and/or same device (e.g., first device) as the integrated circuit. In other cases, the first device is external to a second device comprising the integrated circuit.

In various cases, controlling access to the storage comprises controlling at least one of write access of the first key to the storage of the first device or read access of the first key in the storage of the first device. In some embodiments, controlling access to the storage comprises checking an access control list to determine whether a client of the integrated circuit has at least one of write access of the first key to the storage of the first device or read access of the first key in the storage of the first device. In various instances, checking the access control list to determine whether the entity of the integrated circuit has at least one of write access of the first key to the storage of the first device or read access of the first key in the storage of the first device comprises comparing first information that is unique to the entity against second information in the access control list.

In some embodiments, the integrated circuit further comprises a second circuit associated with an application, wherein controlling access to the storage further comprises blocking the second circuit from reading the first key in the storage of the first device; and a third circuit configured to access an asset using the first key, wherein controlling access to the storage further comprises allowing the third circuit read access to the first key in the storage of the first device.

In various instances, storing the first key in the storage of the first device comprises storing the first key with first information unique to at least one of the integrated circuit or an entity of the integrated circuit having read access or write access of the first key.

In some embodiments, before the first key is stored in the storage of the first device, a third circuit of the integrated circuit is configured to apply confidentiality to the first key; add first data to the first key to protect against modification of the first key; and add second data to associate the first key with a source. After the third circuit of the integrated circuit encrypts the first key and adds the first data and the second data to the first key and, before the first key is stored in the storage of the first device, the first circuit is further configured to further apply confidentiality to the first key by associating the first key with information unique to the integrated circuit; and add third data to the first key to protect against modification of the first key.

In various cases, after the first key is retrieved from the storage of the first device, the first circuit of the integrated circuit is configured to remove confidentiality from the first key; and verify the third data of the first key. After the first key is retrieved from the storage of the first device, the first circuit of the integrated circuit is further configured to verify the first key was retrieved from the storage of the first device.

In some cases, after the first key is retrieved from the storage of the first device, a fourth circuit of the integrated circuit is configured to remove confidentiality from the first key; verify the first data of the first key; and verify the second data of the first key.

In some instances, after the third circuit of the integrated circuit encrypts the first key and adds the first data and the second data to the first key and, before the first key is stored in the storage of the first device, the third circuit is further configured to apply confidentiality to a second key; add additional first data to the second key to protect against modification of the second key; and add additional second data to associate the second key with a second source. The first circuit can be further configured to add the first key and the second key to a key table; apply confidentiality to the key table; add third data to the key table to protect against modification of the key table; and store the key table having the first key and the second key in the storage of the first device. The first circuit can be further configured to retrieve the key table from the storage of the first device; remove confidentiality from the key table; and verify the third data of the key table. The integrated circuit can further include a fourth configured to obtain the first key from the key table; remove confidentiality from the first key; verify the first data of the first key; and verify the second data of the first key.

In various embodiments, the integrated circuit can further include a memory. In some cases, the first circuit can further be configured to determine an application or an asset associated with the first key; based a determination that the application is a first type of application or the determination that the asset is a first type of asset, store the first key on the memory; and based a determination that the application is a second type of application or the determination that the asset is a second type of asset, store the first key in the storage of the first device. In some instances, the first circuit can further be configured to determine a time when the first key is needed; based a determination that the time is less than a threshold, store the first key on the memory; and based a determination that the time is greater than the threshold, store the first key in the storage of the first device. In various cases, the first circuit can be further configured to determine a time when the first key is needed; based a determination that the time is less than a threshold, retrieve the first key from the storage of the first device and store the first key on the memory.

In some instances, the first circuit can further be configured to specify a first location to store the first key in the storage specify a first location to store the first key in the storage; and send the first location of the first key to a second circuit configured to decrypt the asset using the first key in parallel with at least one of sending the asset or a location of the asset to the second circuit.

In another aspect, a method for storing or retrieving a key comprising receiving on a chip at least one of a key or a request to retrieve the key; at least one of storing the key in a storage of a device when the key is received or retrieving the key from the storage of the device when the request to retrieve the key is received, wherein the device is external to the chip; and controlling access to the key stored in the storage of the device.

In yet another aspect, a circuit can be configured to receive at least one of a key or a request to retrieve the key; at least one of store the key in a storage of a second device when the key is received or retrieve the key from the storage of the second device when the request to retrieve the key is received, wherein the second device is external to the first device; and control at least one of read access of the key in the storage of the second device or write access of the key to the storage of the second device.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Similarly, when an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Likewise, when an element is referred to herein as being an "electronic circuit" or simply "circuit", it is commonly recognized as a building block of modern electronics. Circuits are composed of various electronic components such as resistors, capacitors, inductors, diodes, transistors, and integrated circuits. In some cases, integrated circuits can be formed from one or more circuits. These electronic components are carefully selected and interconnected to create a circuit that can perform a specific task or carry out a particular function. Circuits can be as simple as a basic switch that turns a light on and off, or they can be incredibly complex, such as those found in advanced computer systems, communication devices, or medical equipment. Circuits can be categorized into different types based on their purpose or function, including amplifiers, oscillators, filters, power supplies, and logic gates, among others. Additionally, circuits can include software or firmware in addition to hardware or instead of hardware to carry out a particular function.

Additionally, various units, circuits, modules, or other components may be described as "configured to" or "adapted to" perform a task or tasks. In such contexts, "configured to" or "adapted to" is a broad recitation of structure generally meaning "having circuitry that" performs the task or tasks during operation. As such, the unit/circuit/ module/component can be configured to perform the task even when the unit/circuit/module/component is not currently on. In general, the circuitry that forms the structure corresponding to "configured to" or "adapted to" may include hardware circuits and/or memory storing program instructions executable to implement the operation. The memory can include volatile memory such as static or dynamic random-access memory and/or nonvolatile memory such as optical or magnetic disk storage, flash memory, programmable read-only memories, etc. Similarly, various unit/circuit/module/component may be described as performing a task or tasks, for convenience in the description. Such descriptions should be interpreted as including the phrase "configured to" or "adapted to." Reciting a unit/circuit/component that is configured to perform one or more tasks is expressly intended not to invoke 35 U.S.C. § 112, paragraph six interpretation for that unit/circuit/component.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Additionally, it should be understood that spatial descriptions (e.g., "above," "below," "up," "left," "right," "down," "top," "bottom," "middle," "vertical," "horizontal," etc.) used herein are for purposes of illustration only, and that practical implementations of the structures described herein can be spatially arranged in any orientation or manner.

In various existing key storage processes for a system-on-chip (SOC), the key or key table is stored internally on the chip itself. When the key table is stored internally, valuable resources on the chip are utilized to store the key table. As the need to store more key tables and/or keys increases, the size of the chip and amount of silicon needed to manufacture the chip increases.

The proposed key storage process seeks to reduce the use of valuable resources on the chip for storing keys and/or key tables. Instead of storing one or more keys or key tables on chip, the one or more keys or key tables are protected and stored off chip in a storage of an external device. The chip controls access to the storage of the external device to ensure that only authorized entities on the chip are allowed read access or write access to the storage of the external device.

FIG. 1 is a perspective view of system 100 including a system on chip (SOC) 200 and an external device 300. The components of the SOC 200 may be integrated onto a single semiconductor substrate as an integrated circuit or "chip." In other words, the SOC 200 can integrate various components of a computing device onto a single chip. In some embodiments, the components may be implemented on two or more discrete chips in a system. The SOC 200 can be placed in computing devices such as mobile phones, computers, laptops, tablet computers, televisions, set-top boxes, gaming consoles, Internet of Things devices, other devices, or the like.

The SOC 200 might include one or more secure entities or non-secure entities 202. The one or more secure entities or non-secure entities 202 might include, without limitation, one or more applications, one or more application processors, one or more application programs, or the like. The SOC 200 might additionally include one or more additional secure entities 204. The one or more secure entities 202 and/or secure entities 204 might be any entity that has higher privileges within SOC 200. These privileges can be enforced either in software (e.g., Hypervisor), shared hardware (e.g., ARM TrustZone, Intel SGX), separate hardware, or the like. The one or more secure entities 202 and/or secure entities 204 might include, without limitation, an operating system, a kernel, an application programming interface (API), or the like.

In some cases, the SOC 200 further includes an optional key derivation or key ladder module or circuit 206. The key derivation or key ladder module 206 comprises suitable circuitry, logic, hardware, software, and/or code that are adapted to derive one or more secret keys from a secret value such as a master key (e.g., a master key received from the one or more secure entities or non-secure entities 202 or received from secure entity 204, or the like).

In various embodiments, the SOC 200 further includes a key storage 208. The key storage 208 can include suitable circuitry, logic, hardware, software, and/or code that are adapted to store one or more keys or key tables (e.g., one or more keys or key tables received from the one or more secure entities or non-secure entities 202, the secure entity 204, the key derivation or key ladder module 206, or the like). The storage 208 could include volatile memory such as static or dynamic random-access memory and/or nonvolatile memory such as optical or magnetic disk storage, flash memory, programmable read-only memories, etc.

Figure 2:
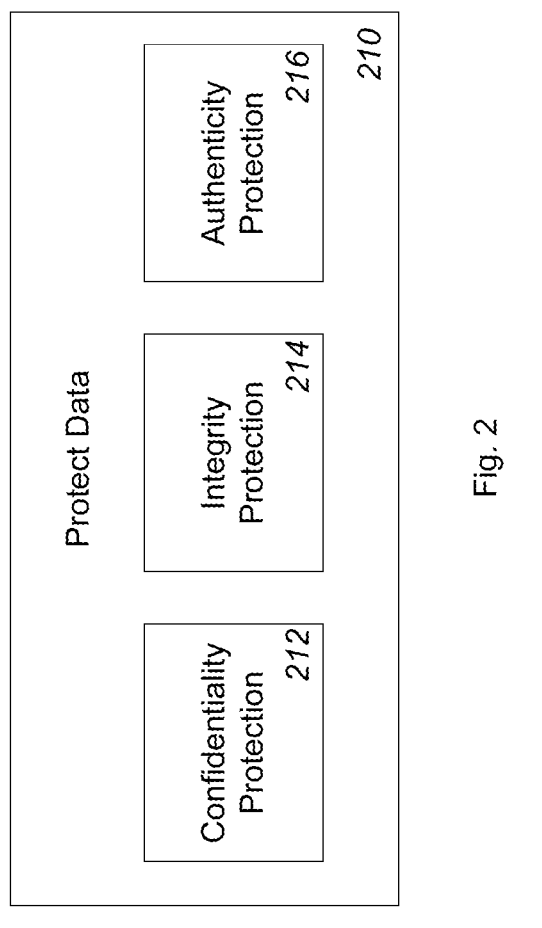
FIG. 2 is a block diagram of a protect data module of the system of FIG. 1, in accordance with various embodiments.
Figure 3:
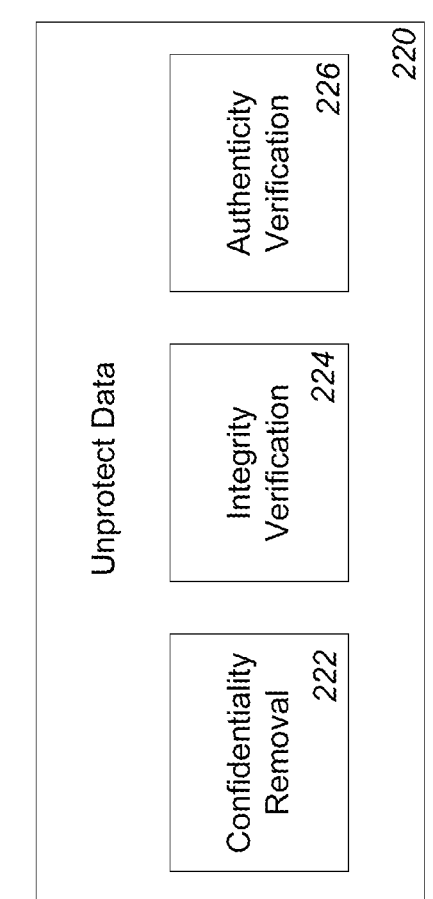
FIG. 3 is a block diagram of a unprotect data module of the system of FIG. 1, in accordance with various embodiments.
Figure 4:
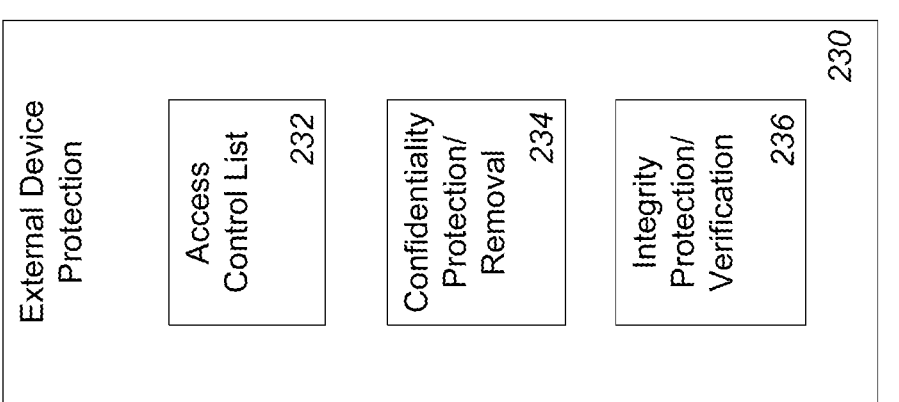
FIG. 4 is a block diagram of an external device protection module of the system of FIG. 1, in accordance with various embodiments.

In various cases, the SOC 200 includes a protect data module or circuit 210 (shown in FIG. 2) and an unprotect data module 220 (shown in FIG. 3). The protect data module 210 can include suitable circuitry, logic, hardware, software, and/or code that are adapted to protect the one or more keys, key tables, or metadata associated with each key, or the like. The protect data module 210 can include a confidentiality protection module or circuit 212 that is configured to apply confidentiality to the one or more keys, key tables, and/or metadata associated with each key. Apply confidentiality to the one or more keys, key tables, and/or metadata associated with each key means encrypting, encoding, scrambling, or providing some other protection to the one or more keys and/or metadata associated with the one or more keys. In some cases, algorithms such as Advanced Encryption Standard (AES) or triple Data Encryption Standard (3DES) or other algorithms capable of providing confidentiality to the one or more keys, key tables, and/or metadata associated with each key can be used to apply confidentiality to the one or more keys, key tables, and/or metadata associated with each key.

The protect data module 210 can further include an integrity protection module or circuit 214. The integrity protection module 214 can add additional data to the one or more keys, key tables, and/or metadata to protect against modification. In a non-limiting example, additional data can be added to the one or more keys, key tables, and/or metadata using a hash function, secure hash algorithms (SHA), Galois/Counter Module (GMC) algorithms, Hash-based message authentication code (HMAC) algorithms, or the like.

In various embodiments, the protect data module 210 also includes an authenticity protection module or circuit 216. The authenticity protection module 216 can be configured to ensure (e.g., add additional data to guarantee) the one or more keys, key tables, and/or metadata belongs to a trusted source via the use of cryptographic functions. The crypto-graphic functions can include, without limitation, Rivest Shamir Adleman (RSA) authentication, Elliptic Curve authentication, or HMAC authentication, or any other cryp-tographic function capable of ensuring the one or more keys, key tables, and/or metadata belongs to a trusted source.

The unprotect data module 220 can include suitable circuitry, logic, hardware, software, and/or code that are adapted to verify and remove confidentiality from (e.g., unencrypt, decode, unscramble, or the like) the one or more keys, key tables, or metadata associated with each key, or the like. The unprotect data module 220 can include a confi-dentiality removal module or circuit 222 that is configured to remove confidentiality from (e.g., unencrypt, decode, unscramble, or the like) the one or more keys, key tables, and/or metadata associated with each key. The unprotect data module 220 can further include an integrity verification module or circuit 224. The integrity verification module 224 can check the additional data added to the one or more keys, key tables, and/or metadata by the integrity verification module 224 to determine whether the one or more keys, key tables, and/or metadata have been modified. In various embodiments, the protect data module 210 also includes an authenticity verification module or circuit 216. The authen-ticity verification module 226 can be configured to check a source of the one or more keys, key tables, and/or metadata. For example, the authenticity verification module 226 can be configured to check additional data added to one or more keys, key tables, and/or metadata belongs by the authenticity protection module 216 to determine that the one or more keys, key tables, and/or metadata come from a trusted or expected source.

In some cases, the SOC 200 further includes an external device protection module or circuit 230. The external device protection module 230 can include suitable circuitry, logic, hardware, software, and/or code that are configured to protect the one or more keys, key tables, and/or metadata, or the like. In some cases, the external device protections module 230 can be used to protect a key table and/or metadata associated with the key table.

The external device protection module 230 can include an access control list or circuit 232. The access control list 232 can be configured to enforce one or more rules of which clients of the SOC 200 can access the keys stored in external device 300. The external device protection module 230 can further include an optional confidentiality protection or removal module or circuit 234. In some cases, the optional confidentiality protection or removal module or circuit 234 can be separate modules (e.g., a confidentiality protection module and a confidentiality removal module). The confi-dentiality protection or removal module or circuit 234 can be used to further apply confidentiality to (e.g., encrypt, encode, scramble, or the like) the one or more keys, key tables, and/or metadata. In some cases, the confidentiality protection or removal module 234 can use scrambling algorithms or encryption algorithms such as Advanced Encryption Standard (AES) or triple Data Encryption Stan-dard (3DES) or other algorithms to further protect and apply confidentiality to the one or more keys, key tables, and/or metadata. The external device protection module 230 can further include an optional integrity protection or verifica-tion module or circuit 236. In some cases, the optional integrity protection or verification module or circuit 236 can be separate modules (e.g., an integrity protection module and an integrity verification module). The optional integrity protection or verification module or circuit 236 can add additional data to and verify the additional data of the one or more keys, key tables, and/or metadata to protect against modification. In a non-limiting example, additional data can be added to the one or more keys, key tables, and/or metadata using a hash function, secure hash algorithms (SHA), GMC algorithms, HMAC algorithms, or the like. In some cases, the integrity protection or verification module 236 can add additional data to a key table and the metadata associated with the one or more keys before the key table and/or metadata is stored on the external device 300.

In various cases, the SOC 200 further includes one or more cryptographic engines or circuits 240. The crypto-graphic engine 240 can include suitable circuitry, logic, hardware, software, and/or code that are configured to utilize one or more keys or the key table to access (e.g., decrypt, decode, or unscramble, or the like) an asset (e.g., media content, audio content, gaming content, keys, certificates, licenses, or any other asset that must be protected from a non-secure source or non-secure entity, or the like).

System 100 further includes external device 300 which can be external to the SOC 200. In some cases, the external device 300 is external the SOC 200, but contained within the same circuit board (e.g., a printed circuit board, or the like) and/or same device (e.g., a laptop, computer, phone, gaming console, or the like) as the SOC 200. The external device 300 can also be external to a device (e.g., a laptop, computer, phone, gaming console, or the like) containing the SOC 200. In a non-limiting example, if the SOC 200 is part of a smart phone, the external device 300 might be a server in a service provider network external to the smart phone. The external device 300 can include a storage 302. The storage 302 could include volatile memory such as static or dynamic random-access memory and/or nonvolatile memory such as optical or magnetic disk storage, flash memory, programmable read-only memories, etc.

Figure 5:
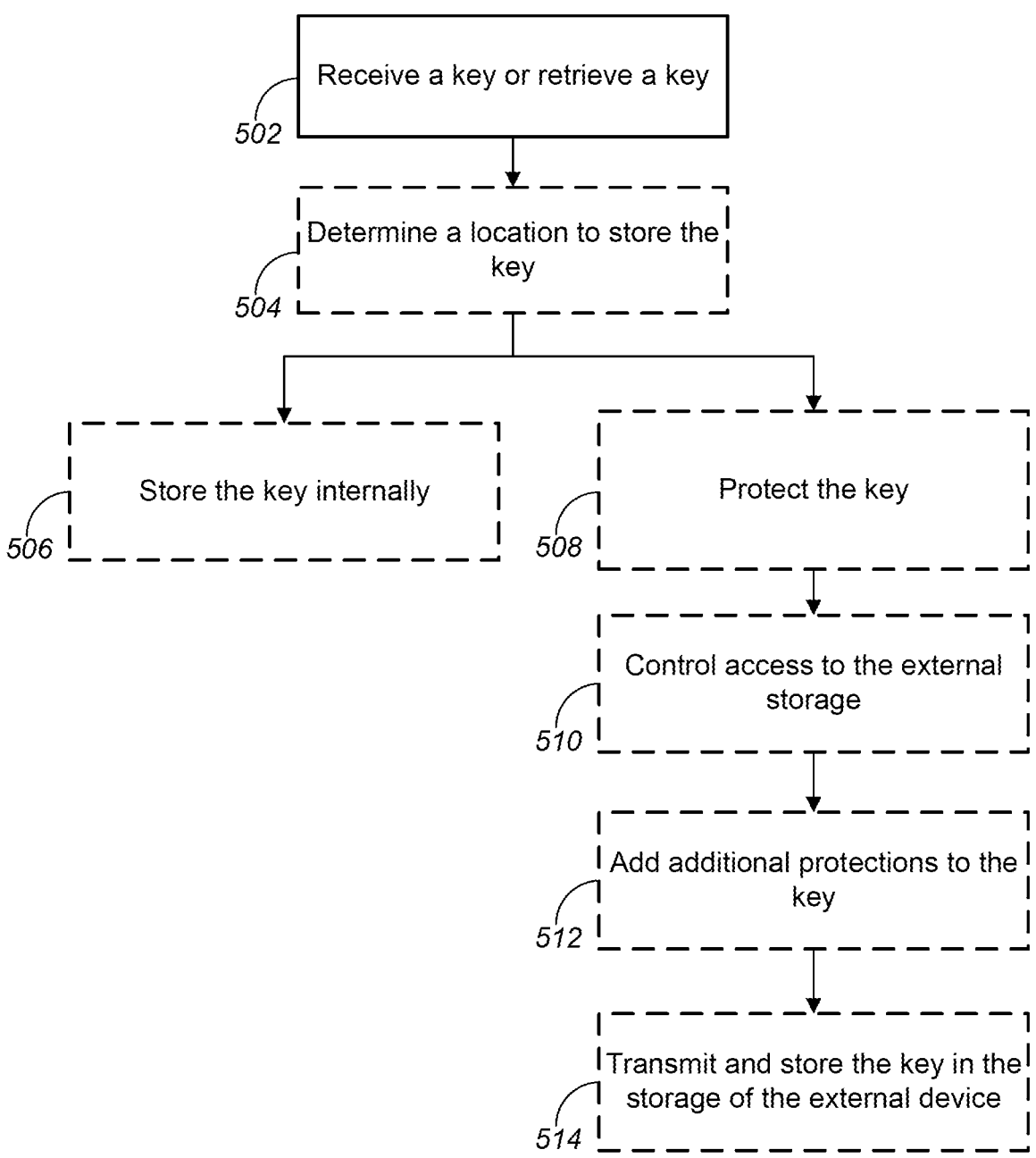
FIG. 5 is a flow diagram of a method to store a key, in accordance with various embodiments.
Figure 6:
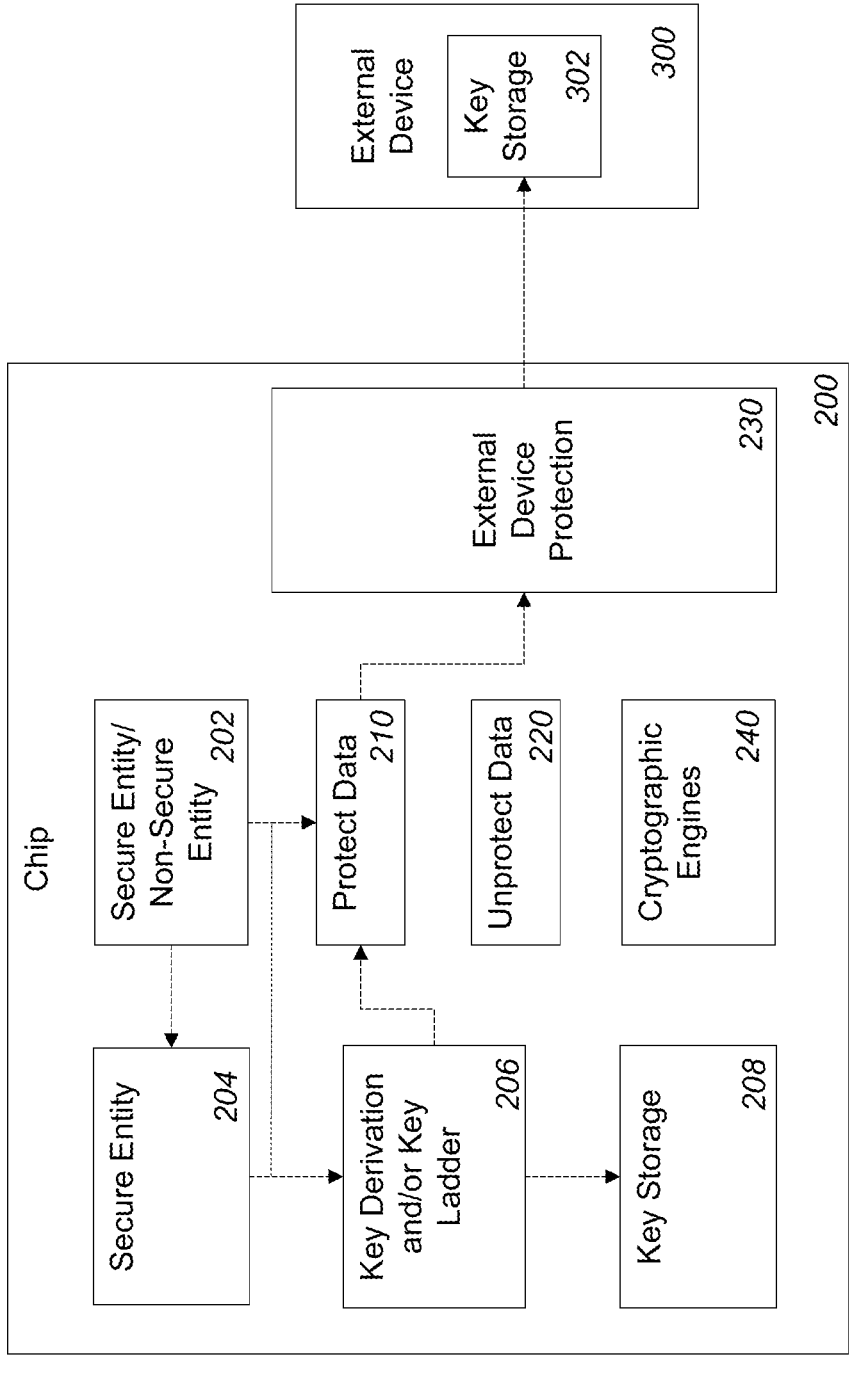
FIG. 6 is a block diagram of the system of FIG. 1 having one or more connectors or arrows to illustrate the flow diagram of FIG. 5, in accordance with various embodiments.

Turning to FIGS. 5 and 6, FIG. 5 is a flow diagram 500 illustrating a process or method to store one or more keys in a storage of an external device, in accordance with various embodiments and FIG. 6 is the system 100 of FIG. 1 having one or more connectors or arrows associated with the flow diagram of FIG. 5. These diagrams merely provide an example, which should not unduly limit the scope of the claims. In some embodiments, the system 100 shown in FIG. 1 is capable of performing the storage of the one or more keys described in FIG. 5. However, the method is not limited to only being performed with system 100 of FIG. 1 and can be performed by other system-on-chips or other types of chips. In some cases, a processor or a circuit of system 100 is configured to execute the method 500. In some cases, different controllers or circuits are configured to execute one or more blocks or steps of the method 500. Alternatively, a single controller is configured to execute the blocks or steps of the method 500.

Method 500 might begin at block 502 by receiving or retrieving a key and/or metadata associated with the key from one or more secure entities or non-secure entities 202 of a system-on-chip (SOC) 200 or from one or more secure entities or non-secure entities external to the SOC 200. In some cases, the key might be received from one or more secure entities or non-secure entities 202. Alternatively, the one or more secure entities or non-secure entities 202 might request that the secure-entity 204 retrieve a key associated with the one or more secure entities or non-secure entities 202.

The key might be associated with assets (e.g., media content, audio content, gaming content, keys, certificates, licenses, or any other asset that must be protected from a non-secure source or non-secure entity, or the like for use by one or more applications, etc.) from one or more applications, media content producers, media content broadcasters, or the like. The key can be used to access (e.g., decode, decrypt, unscramble, etc.) an asset and block unauthorized users from accessing the asset delivered by the one or more applications, media content producers, media content broadcasters, or the like. Additionally or alternatively, the key can be used to identify or authenticate a source of data or authenticate. In some cases, the key might be a symmetric key or an asymmetric key or the like. The key can include, without limitation, a root key configured to authenticate and sign certificates, a master key used to provide confidentiality to other keys, a key encryption key configured to provide confidentiality to other keys, a digital signature key configured to identify a source of an asset, an authentication key configured to identify a source of an asset, a data encryption key configured to provide confidentiality to an asset, and/or any other key configured to access, authenticate, and/or identify an asset, and/or the like. The key might be used by the one or more cryptographic engines 240 to access the asset for display or use. In some cases, the key might be stored in a key table (e.g., a table that stores (1) one or more keys and metadata associated with the one or more keys and (2) relationships between one or more keys and/or metadata associated with the one or more keys).

In some cases, the keys can be protected at runtime depending on the needs of the one or more secure entities or non-secure entities. In other words, method 500 might begin to protect and transmit the key and/or metadata to an external device 300 upon operation or startup of the one or more secure entities or non-secure entities and/or upon operation or startup of an asset of the one or more secure entities or non-secure entities.

In some embodiments, the key and/or metadata associated with the key may be received by at least one of the secure entity 204 of the SOC 200, the key derivation or key ladder module 206, or the protect data module 210. In some cases, the secure entity 204 receives the key and/or metadata associated with the key from the one or more secure entities or non-secure entities and then optionally sends the key to the key derivation or key ladder module 206 or optionally sends the key to the protect data module 210. In other cases, the one or more secure entities or non-secure entities can send the key and/or metadata associated with the key directly to the key derivation or key ladder module 206 or the protect data module 210. The key derivation module 206 can send the key to the protect data module 210. The key and/or metadata associated with the key can be optionally sent to the key derivation module 206 to generate a unique key from the received key. The unique key generated using the key derivation module 206 can be unique to and associated with the SOC 200 and/or the device containing the SOC 200.

In some cases, instead of sending the key, the one or more secure entities or non-secure entities can request a key to be generated by the key derivation module 206. The key derivation module 206 can then generate a unique key based on the request. The unique key generated using the key derivation module 206 can be unique to and associated with the SOC 200 and/or the device containing the SOC 200.

Once the key and/or metadata associated with the key is received or retrieved by the SOC 200 or generated by the key derivation module 206, the secure entities or non-secure entities 202, or secure entity 204 can optionally determine at block 504 a location to store the key and/or metadata associated with the key. For example, the secure entities or non-secure entities 202, or secure entity 204 can optionally determine whether the key and/or metadata associated with the key should be stored internally on the SOC 200 (e.g., in key storage 208) or externally off the SOC 200 (e.g., in key storage 302). Alternatively, in other cases, there may not be a determination about where to store the key and/or metadata associated with the key and, instead, the key and/or metadata associated with the key is always stored in storage 302 of the external device 300.

In order to determine where to store the key and/or metadata associated with the key, one or more rules can be made to control where the key and/or metadata associated with the key is stored. In a non-limiting example, the determination may be made based on memory availability of the key storage 208 and/or key storage 302. If there is limited availability in key storage 208 or if key storage 208 is full, then the key storage 302 can be used to store the key and/or metadata associated with the key. However, if there is availability in key storage 208, the key storage 208 can be selected to store the key and/or metadata associated with the key. Alternatively, if there is availability in key storage 302, then key storage 302 can be selected to store the key and/or metadata associated with the key.

In other cases, the SOC 200, secure entities or non-secure entities 202, or secure entity 204 can select where to store the key and/or metadata associated with the key based on an application associated with the first key, an application type (e.g., streaming service, broadcast service, gaming application, etc.) associated with the first key, an asset type (e.g., media content, audio content, gaming content, keys, certificates, licenses, or the like etc.) associated with the first key, or the like. Alternatively, in other cases, a source of the key (e.g., secure entities or non-secure entities, or the like) can specify where to store the key (e.g., in key storage 208 or in key storage 302) and/or metadata associated with the key.

In other cases, the SOC 200, secure entities or non-secure entities 202, or secure entity 204 can select where to store the key and/or metadata associated with the key based on when the key is needed. In a non-limiting example, if the key is needed at a first time within a threshold or an amount of time (e.g., 1 second, 5 seconds, 1 minute, 5 minutes, etc.), the key and/or metadata associated with the key can be stored in key storage 208. However, if the key is needed at a second time outside of the threshold or the amount of time, then the key and/or metadata associated with the key can be stored in key storage 302.

In some cases, the key and/or metadata associated with the key can be moved from the key storage 302 to the key storage 208 based on when the key is needed. In a non-limiting example, when an asset (e.g., video content, or the like) is being streamed, then the key and/or metadata associated with the key can be stored in key storage 302 and as the video content approaches a time stamp associated with the key and/or metadata associated with the key or is within a threshold (e.g., 1 second, 5 seconds, or the like) of the time stamp associated with the key and/or metadata associated with the key, the key and/or metadata associated with the key can be moved from storage 302 to key storage 208 to reduce latency of retrieving the key and/or metadata associated with the key from key storage 302.

Based on a determination that the key and/or metadata associated with the key should be stored internally, the method 500 can proceed to optional block 506 and store the key and/or metadata associated with the key internally on key storage 208. Based on a determination that the key and/or metadata associated with the key should be stored externally, the method 500 can proceed to optional block 508 and protect the key (e.g., the received key and/or the key generated by the key derivation and/or key ladder module 206) and/or metadata associated with the key for transmission to key storage 302 of external device 300.

Protecting the key and/or metadata associated with the key for transmission to the key storage might include using protect data module 210. Protect data module 210 contains the necessary components to protect the key and/or metadata associated with each key. Confidentiality protection module 212 can be used to apply confidentiality to (e.g., encrypt, encode, scramble, or the like) the key and/or metadata associated with the key. Applying confidentiality to the key and/or metadata associated with the key provides protection in case an external attacker tries to access the key or data (e.g., metadata or the like) associated with the key. The algorithm or data utilized to apply confidentiality to the key or metadata associated with the key is generated inside the SOC 200 and is unique to the SOC 200 and/or to the device containing the SOC 200. Thus, the confidentiality applied to the key and/or metadata associated with the key can only be removed (e.g., decrypted, decoded, unscrambled, or the like) using the algorithm or data unique to the SOC 200 and/or the device containing the SOC 200. The integrity protection module 214 ensures that when the key and/or metadata associated with the key comes back to the SOC 200, the key or metadata associated with the key has not been changed or modified. The integrity protection can be done by adding additional information, for example a Hash, to the key and/or metadata associated with the key. The additional integrity data which is attached to the key and or metadata changes if the original data is modified. The authenticity protection module 216 can further add an extra layer to guarantee that the information belongs to a trusted source via the use of cryptographic functions.

Next, before the key and/or metadata associated with the key is transmitted or sent to key storage 302, the method 500, at block 510, might continue by controlling access to the key storage 302 of the external device 300. Controlling access can include (1) determining whether a requesting client (e.g., secure entities or non-secure entities 202, secure entity 204, cryptographic engines 250, or the like) has one or more permissions (e.g., read access or write access) to communicate or access either directly or indirectly (e.g., through external device protection module 340 or other module) with key storage 302 of the external device 300 and (2) only allowing clients with one or more permissions (e.g., read access or write access) to communicate with or access key storage 302 of the external device 300.

External device protection module 340 can include an access control list 232 that enforces one or more rules or permissions of which clients (e.g., secure entities or non-secure entities 202, secure entity 204, cryptographic engines 250, or the like) of the SOC 200 can access the keys in key storage 302. The access control list 232 can compare one or more client IDs of the client (e.g., secure entities or non-secure entities 202, secure entity 204, cryptographic engines 250, etc.) or other information unique to the client to information in an access control list and ensure that only authorized clients with authorized client IDs or other information unique to the client can access the secure storage 302.

The access control list 232 can have one or more rules that control which clients have read access to the key storage 302 and which clients have write access to the key storage 302. In a non-limiting example, only particular secure entities or non-secure entities 202 might have write access to the secure storage 302. Alternatively, none of secure entities or non-secure entities 202 can have write access to key storage 302 and instead must utilize secure entity 204 to write to secure storage 302. Additionally, while secure entities or non-secure entities 202 and/or secure entity 204 might have write access to write the key to storage 302, the secure entities or non-secure entities 202 and/or secure entity 204 might not have read access to read the key stored in key storage 302. Entities such as cryptographic engines 240 may have read access to the storage 302, but not write access to key storage 302.

In some cases, the method 500 can proceed to optional block 512 and add additional protections to the key and/or metadata associated with the key. Confidentiality protection and removal module 234 and integrity protection and verification module 236 can be used to add additional layers of protection to the key before it is transmitted to key storage 302. In some cases, the confidentiality protection and removal module 234 and integrity protection and verification module 236 can protect each key and/or metadata associated with each key. Additionally, in some cases, confidentiality protection and removal module 234 and integrity protection and verification module 236 can apply protections to all data associated with keys (e.g., the key, metadata, key table, etc.) and/or all data stored in storage 302 of external device 300.

Confidentiality protection and removal module 234 can further apply confidentiality to (e.g., encrypt, encode, scramble, or the like) the key and/or metadata associated with the key. For example, confidentiality protection and removal module 234 can scramble the key and/or metadata associated with the key using scrambling algorithms or encrypt the key using encryption algorithms. In a non-limiting example, confidentiality protection module 212 can apply confidentiality to the key, but not metadata associated with the key while confidentiality protection and removal module 234 can apply confidentiality to both the metadata and the key for transmission to key storage 302. In some cases, the external device protection module 230 can add the key and/or metadata associated with the key to a key table and then the confidentiality protection and removal module 234 can apply confidentiality to (e.g., encrypt, encode, scramble, or the like) the entire key table before the key table is transmitted to storage 302 of the external device 300. In this way, the key is protected individually by the confidentiality protection module 212 and the key, metadata, and/or key table are protected together as a group by the confidentiality protection and removal module 234.

Both confidentiality protection module 212 and confidentiality protection and removal module 234 protect against data being extracted or obtained from the external device 300 (e.g., re-soldering a flash into another box and extracting all data). For example, both confidentiality protection module 212 and confidentiality protection and removal module 234 use algorithms unique to SOC 200 to apply confidentiality to the key, metadata associated with the key, and/or key table. By using algorithms unique to SOC 200, only algorithms located on the SOC 200 can be used to remove confidentiality from the key, metadata associated with the key, and/or key table. Additionally, both confidentiality protection module 212 and confidentiality protection and removal module 234 also ensure that data cannot be copied across different devices. For example, it is not possible for a hacker to extract or obtain data from external device protection module 230 and copy it over to another device. Similarly, even if a hacker re-solders external device protection module 230 from a first device into a second device, the keys would not work. The keys would not work because each key is uniquely bound to the device and/or SOC 200 using confidentiality protection algorithms that are unique to SOC 200.

The integrity protection and verification module 236 ensures that when the key and/or metadata associated with the key comes back to the SOC 200, the key or metadata associated with the key has not been changed or modified. The integrity protection can be done by adding additional information, for example a Hash, to the key. In some cases, the difference between integrity protection module 214 and the integrity protection and verification module 236 is that integrity protection and verification module 236 can detect integrity attacks on an entire key table while integrity protection module 214 can only be used to detect attacks on a particular key of the key table. In order to detect integrity attacks on each key, integrity protection module 214 applies integrity protection to each key. In order to detect integrity attacks on an entire key table, the external device protection module 230 can protect all data that is stored in storage 302 at runtime. In a non-limiting example, the external device protection module 230 can add the key and/or metadata associated with the key to a key table and/or to other data that is to be stored in external device 300 and then the integrity protection and verification module 236 can add additional information to the entire key table including the key and/or other data including the key before the key table is transmitted to storage 302 of the external device 300.

Once the additional protections are added, at block 512, the method 500 can continue to block 514 and transmit the key and/or metadata associated with the key to the storage 302 of the external device 300 and store the key and/or metadata associated with the key in the storage 302 of the external device 300. In some cases, the key and/or metadata associated with the key can be added to a key table. The key and/or metadata associated with the key can be added to the key table at the external device protection module 230 and/or can be added to a key table stored in storage 302. By adding the key and/or metadata associated with the key to the key table at external device protection module 230, latency of transmitting the key, multiple keys, and/or metadata associated with the key(s) can be reduced because the key table can be used to transmit multiple keys and/or metadata associated with the key(s). The key table can be used to store and manage the keys used for accessing assets (e.g., media content, audio content, gaming content, keys, certificates, licenses, or any other asset that must be protected from a non-secure source or non-secure entity, or the like). The key table can include the actual key material, metadata about the keys (e.g., key usage policies, information about who has access to the keys, creation and expiration dates), and information about who has access to the keys (e.g., Access Control List/Rights).

In some cases, the one or more secure entities or non-secure entities 202 and/or secure entity 204 can indicate the required key location at same time it pushes the key and/or metadata through protect data operations (e.g., modules 212-216 and/or modules 232-236). In other words, the one or more secure entities or non-secure entities 202 and/or secure entity 204 can specify where to store the key and/or metadata associated with the key in the key table and/or in external storage 302 at the same time the key and/or metadata associated with the key is being processed through the protect module 210 and external device protection module 230. By indicating where to store the key and/or metadata in parallel with processing the key and/or metadata, latency within SOC 200 can be reduced and the key and/or metadata can be more efficiently stored in storage 302.

In some cases, the transmission of the key and/or metadata associated with the key from the SOC 200 and/or external device protection module 230 to the storage 302 of the external device 300 can be done using one or more secure protocols and/or non-secure protocols. The secure protocols can include, without limitation, TCP IP, Transport Layer Security (TLS), or any other protocol (proprietary or public) which can provide a secure link between SOC 200 and external device 300.

Figure 7:
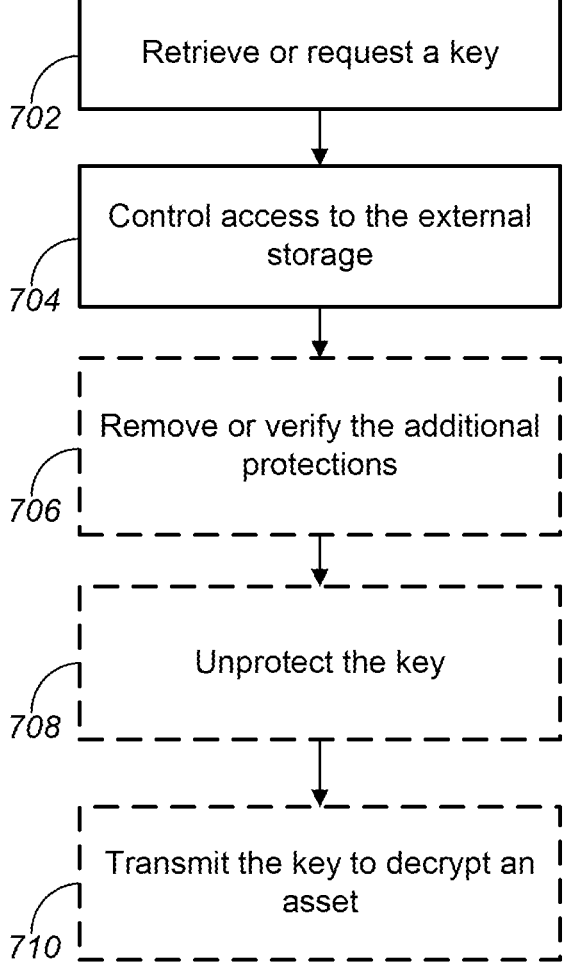
FIG. 7 is a flow diagram of a method to retrieve a key, in accordance with various embodiments.
Figure 7:
Figure 8:
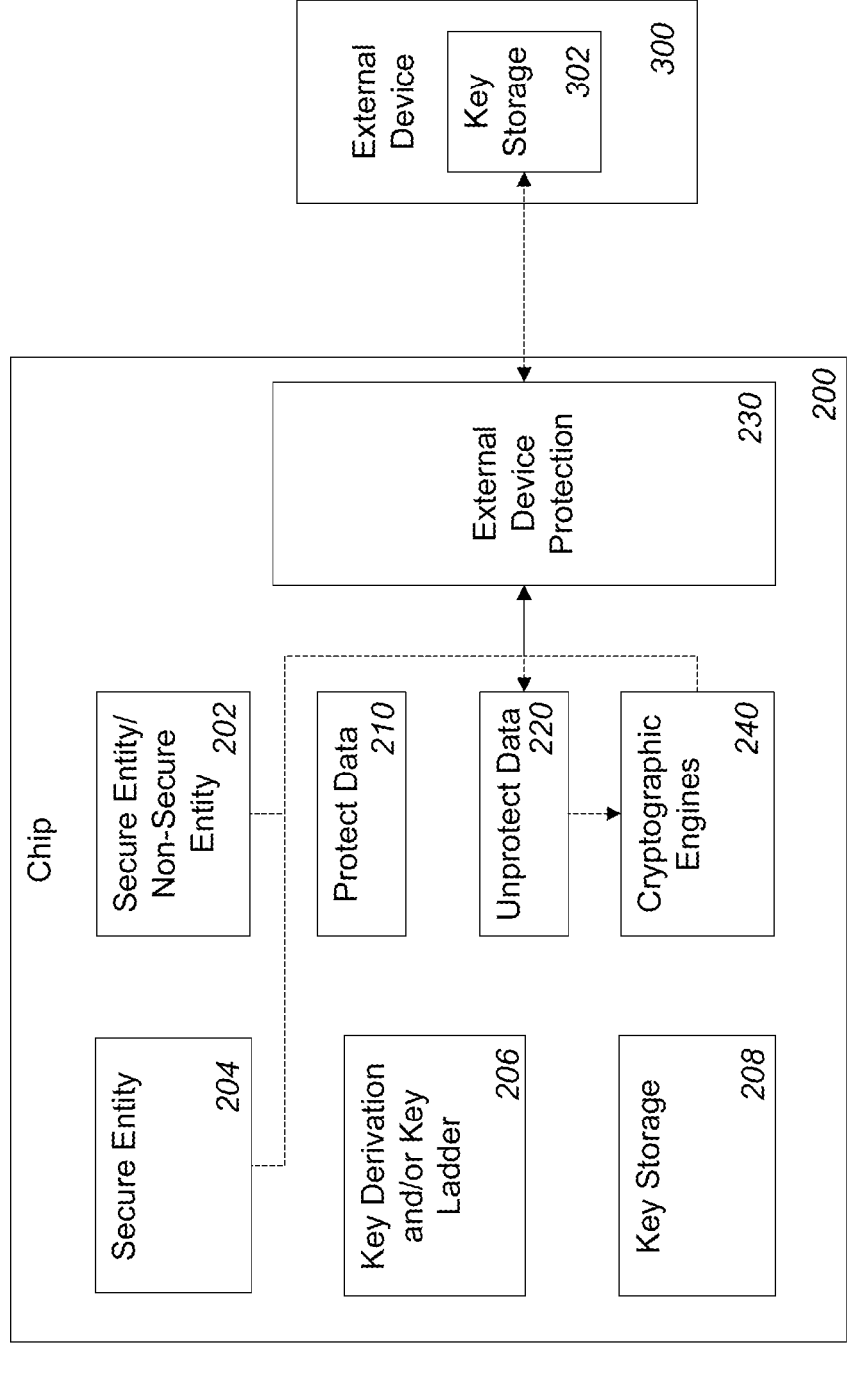
FIG. 8 is a block diagram of the system of FIG. 1 having one or more connectors or arrows to illustrate the flow diagram of FIG. 7, in accordance with various embodiments.

Turning to FIGS. 7 and 8, FIG. 7 is a flow diagram 700 illustrating a process or method to request one or more keys from a storage of an external device, in accordance with various embodiments and FIG. 8 is the system 100 of FIG. 1 having one or more connectors or arrows associated with the flow diagram of FIG. 7. These diagrams merely provide an example, which should not unduly limit the scope of the claims. In some embodiments, the system 100 shown in FIG. 1 is capable of performing the request of the one or more keys described in FIG. 7. However, the method 700 is not limited to only being performed with system 100 of FIG. 1 and can be performed by other system-on-chips or other types of chips. In some cases, a processor or a circuit of system 100 is configured to execute the method 700. In some cases, different controllers or circuits are configured to execute one or more blocks or steps of the method 700. Alternatively, a single controller is configured to execute the blocks or steps of the method 700.

Method 700 might begin at block 702 by requesting or retrieving a key, metadata associated with the key, and/or a key table from a storage 302 of the external device 300. The request might be received from one or more secure entities or non-secure entities 202 of a system-on-chip (SOC) 200, from or more secure entities or non-secure entities external to the SOC 200, from one or more secure entities 204, from one or more cryptographic engines 240, and/or the like. The request to retrieve the key, metadata associated with the key, and/or a key table from a storage 302 of the external device 300 might be received by external device protection module 230. In some cases, external device protection module 230 might retrieve a key and/or metadata associated with the key.

Next, the method 700 can continue at block 704 and control access to the key, metadata associated with the key, and/or a key table stored in the storage 302 of the external device. The external device protection module 230 can control access to the key, metadata associated with the key, and/or a key table stored in the storage 302 of the external device 300. In a non-limiting example, although the one or more secure entities or non-secure entities can request the key, metadata associated with the key, and/or a key table associated with the key, the one or more secure entities or non-secure entities might not have read access to the key, metadata associated with the key, and/or a key table and can instead designate a cryptographic engine 240 to use the key. The external device protection module 230 can check (e.g., by comparing an ID of the cryptographic engine 240 to an access control list) using the access control list module 232 whether the cryptographic engine 240 has authorization to read the key and/or authorization to use the key to access an asset. Based on a determination that the cryptographic engine 240 has authorization, the external device protection module 230 can send the key, metadata associated with the key, and/or a key table to the cryptographic engine 240.

Once the external device protection module 230 determines that a client (e.g., cryptographic engine 240, or the like) has authorization to read the key, metadata associated with the key, and/or a key table, the method 700 can proceed to optional block 706 and remove or verify the additional protections added by the external device protection module 230 at block 512 of FIG. 5. In some cases, confidentiality protection and removal module 234 can remove confidentiality (e.g., decrypt, decode, unscramble, or the like) from the key, metadata associated with the key, and/or a key table. For example, confidentiality protection and removal module 234 can unscramble the key, metadata associated with the key, and/or a key table using unscrambling algorithms or decrypt the key using decryption algorithms. The confidentiality protection and removal module 234 can utilize data that is generated inside the SOC 200 and is unique to the SOC 200 and/or to the device containing the SOC 200 to remove confidentiality from the key, metadata, and/or key table. The integrity protection and verification module 236 can ensure that when the key, metadata associated with the key, and/or a key table comes back to the SOC 200, the key, metadata associated with the key, and/or a key table has not been changed or modified. The integrity protection can be done by verifying the additional information, for example a Hash, is the same data as when the key, metadata associated with the key, and/or a key table was transmitted to storage 302. In some cases, the integrity protection and verification module 236 can further determine whether the key, metadata associated with the key, and/or a key table was retrieved from the correct external device. In a non-limiting example, the integrity protection and verification module 236 can determine whether the key, metadata associated with the key, and/or a key table was retrieved from an external device associated with particular device ID. If the integrity protection and verification module 236 determines that the key, metadata associated with the key, and/or a key table was retrieved from a different device than the external device associated with particular device ID, then the key, metadata associated with the key, and/or a key table might not be used to decode the asset.

Next, method 700 can continue on to block 708 and unprotect the key and/or metadata associated with the key. The key and/or metadata associated with the key can be protected using the block 508 of FIG. 5. In order to unprotect the key and/or metadata, the unprotect data module 220 can be used to optionally extract or obtain the key from the key table. Alternatively, the external device protection module 230 can optionally extract or obtain the key from the key table.

Next, unprotect data module 220 can the reverse the protections applied by the protect data module 210. In a non-limiting example, confidentiality removal module 222 can be used to remove confidentiality from (e.g., decrypt, decode, unscramble, or the like) the key and/or metadata associated with the key. The algorithm to remove confidentiality can utilize data that is generated inside the SOC 200 and is unique to the SOC 200 and/or to the device containing the SOC 200 to remove confidentiality from the key and/or metadata. The integrity verification module 224 ensures that when the key and/or metadata associated with the key comes back to the SOC 200, the key or metadata associated with the key has not been changed or modified. The integrity verification can be done by verifying that the additional information, for example a Hash, added to the key and/or metadata associated with the key is the same as before it key and/or metadata was stored in storage 302 of the external device 300. If the additional information was modified, then the integrity verification module 224 can indicate that the key and/or metadata is not the same and that the key and/or metadata should not be used. The authenticity verification module 316 can verify that the key and/or metadata is from an expected source.

Once the key and/or metadata is unprotected, the key and/or metadata can be sent to a cryptographic engine 240 to access (e.g., decrypt, decode, unscramble, etc.), authenticate, display, and/or use an asset.

In some cases, the one or more secure entities or non-secure entities 202 and/or secure entity 204 can indicate to a cryptographic engine 240 a location of a key stored in storage 302 or storage 208 in parallel with the cryptographic engine 240 receiving the asset or a location of the asset associated with the key. In other words, the one or more secure entities or non-secure entities 202 and/or secure entity 204 can specify where the key and/or metadata associated with the key are stored in the key table and/or in external storage 302 or storage 308 before the key is stored or set in storages 302 or 208 and/or before the key is processed through modules 210, 220, or 230. Then, when the cryptographic engine 240 receives an asset associated with the key, the cryptographic engine 240 can receive or determine the location of the key at the same time (e.g., in parallel, or the like) the cryptographic engine 240 receives the asset or the location of the asset. In other words, one command can be used to cause the cryptographic engine 240 to receive the asset and/or a location associated with the asset and a location of the key associated with the asset. By indicating where the key and/or metadata is stored in parallel with receiving the asset or receiving a location of the asset, latency within SOC 200 can be reduced and the key and/or metadata can be more efficiently retrieved from storage 302 and the asset can be more efficiently accessed by the cryptographic engine 240. The cryptographic engine 240 can then retrieve the key and/or the asset from the location specified by the one or more secure entities or non-secure entities 202 and/or secure entity 204 and access the asset using the key.

In some cases, once the key and/or metadata associated with the key is retrieved by external device protection module 230 from storage 302, a copy of the key, key table, and/or metadata might remain within storage 302 of external device 300. If a copy of the key, key table, and/or metadata remains within storage 302 of external device 300, then the key and/or metadata associated with the key could be used again or eventually overwritten. Alternatively, the key and/or metadata associated with the key could be deleted from storage 302. One or more secure entities or non-secure entities 202 and/or secure entity 204 could set one or more rules indicating whether the key and/or metadata associated with the key should be saved or deleted.

The techniques and processes described above with respect to various embodiments may be used to store one or more keys, metadata associated with keys, and/or key tables, as described herein. As discussed above, by storing the one or more keys, metadata associated with keys, and/or key tables off chip in an external device silicon requirements of the chip can be reduced or alternatively used for other clients or resources of the chip. Additionally, by storing the one or more keys, metadata associated with keys, and/or key tables off chip in an external device, latency can be reduced because the SOC can have more keys available and ready to be used.

While some features and aspects have been described with respect to the embodiments, one skilled in the art will recognize that numerous modifications are possible. For example, the methods and processes described herein may be implemented using hardware components, custom integrated circuits (Ics), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Referring generally again to FIGS. 5 and 7, for the purposes of the present disclosure, the term "controller," "processor" or "processing element" may be broadly defined to encompass any device having one or more processing or logic elements (e.g., one or more micro-processor devices, one or more application specific integrated circuit (ASIC) devices, one or more field programmable gate arrays (FP-GAs), or one or more digital signal processors (DSPs)). In this sense, the one or more processors may include any device configured to execute algorithms and/or instructions (e.g., program instructions stored in memory). Furthermore, the memory may include any storage medium known in the art suitable for storing program instructions executable by the associated processor. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the processor. In embodiments, the memory medium may be located remotely with respect to the physical location of the processor.

In the present disclosure, the methods, operations, and/or functionality disclosed may be implemented as a step switching hardware system and/or as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

What is claimed is:

1. An integrated circuit comprising:

a first circuit configured to:

receive at least one of a first key;

store the first key in a storage of a first device in response to receiving the first key, wherein the first device is external to the integrated circuit; and a third circuit of the integrated circuit is configured to:

apply confidentiality to the first key;

add first data to the first key to protect against modification of the first key; and add second data to the first key to associate the first key with a source;

apply confidentiality to a second key;

add additional first data to the second key to protect against modification of the second key; and add additional second data to the second key to associate the second key with a second source; and the first circuit is further configured to:

add the first key and the second key to a key table;

apply confidentiality to the key table;

add third data to the key table to protect against modification of the key table; and store the key table having the first key and the second key in the storage of the first device;

control access to the first key stored in the storage of the first device.

2. The integrated circuit of claim 1, wherein the first device is external to a second device comprising the integrated circuit.

3. The integrated circuit of claim 1, wherein controlling access to the storage comprises controlling at least one of write access of the first key to the storage of the first device or read access of the first key in the storage of the first device.

4. The integrated circuit of claim 3, wherein controlling access to the storage comprises checking an access control list to determine whether a client of the integrated circuit has at least one of write access of the first key to the storage of the first device or read access of the first key in the storage of the first device.

5. The integrated circuit of claim 4, wherein checking the access control list to determine whether the client of the integrated circuit has at least one of write access of the first key to the storage of the first device or read access of the first key in the storage of the first device comprises comparing first information that is unique to the client against second information in the access control list.

6. The integrated circuit of claim 1, further comprising:

a second circuit associated with an application, wherein controlling access to the storage further comprises blocking the second circuit from reading the first key in the storage of the first device; and a third circuit configured to access an asset using the first key, wherein controlling access to the storage further comprises allowing the third circuit read access to the first key in the storage of the first device.

7. The integrated circuit of claim 1, wherein storing the first key in the storage of the first device comprises:

storing the first key with first information unique to at least one of the integrated circuit or a client of the integrated circuit having read access or write access of the first key.

8. The integrated circuit of claim 1, wherein, after the third circuit of the integrated circuit encrypts the first key and adds the first data and the second data to the first key and, before the first key is stored in the storage of the first device, the first circuit is further configured to:

further apply confidentiality to the first key by associating the first key with information unique to the integrated circuit; and add third data to the first key to protect against modification of the first key.

9. The integrated circuit of claim 8, wherein, after the first key is retrieved from the storage of the first device, the first circuit of the integrated circuit is configured to:

remove confidentiality from the first key; and verify the third data of the first key.

10. The integrated circuit of claim 9, wherein, after the first key is retrieved from the storage of the first device, the first circuit of the integrated circuit is further configured to:

verify the first key was retrieved from the storage of the first device.

11. The integrated circuit of claim 1, wherein, after the first key is retrieved from the storage of the first device, a fourth circuit of the integrated circuit is configured to:

remove confidentiality from the first key;

verify the first data of the first key; and verify the second data of the first key.

12. The integrated circuit of claim 1, wherein the first circuit is further configured to:

retrieve the key table from the storage of the first device;

remove confidentiality from the key table; and verify the third data of the key table; and a fourth circuit of the integrated circuit is configured to:

obtain the first key from the key table;

remove confidentiality from the first key;

verify the first data of the first key; and verify the second data of the first key.

13. The integrated circuit of claim 1, the integrated circuit further comprising a memory, wherein the first circuit is further configured to:

determine an application or an asset associated with the first key;

based a determination that the application is a first type of application or the determination that the asset is a first type of asset, store the first key on the memory; and based a determination that the application is a second type of application or the determination that the asset is a second type of asset, store the first key in the storage of the first device.

14. The integrated circuit of claim 1, the integrated circuit further comprising a memory, wherein the first circuit is further configured to:

determine a time when the first key is needed;

based a determination that the time is less than a threshold, store the first key on the memory; and based a determination that the time is greater than the threshold, store the first key in the storage of the first device.

15. The integrated circuit of claim 1, the integrated circuit further comprising a memory, wherein the first circuit is further configured to:

determine a time when the first key is needed; and based a determination that the time is less than a threshold, retrieve the first key from the storage of the first device and store the first key on the memory.

16. The integrated circuit of claim 1, wherein the first circuit is further configured to:

specify a first location to store the first key in the storage; and send the first location of the first key to a second circuit configured to access an asset using the first key in parallel with at least one of sending the asset or a location of the asset to the second circuit.

17. A method for storing or retrieving a key comprising:

receiving on a chip at least one of a first key, apply confidentiality to the first key;

add first data to the first key to protect against modification of the first key; and add second data to the first key to associate the first key with a source;

apply confidentiality to a second key;

add additional first data to the second key to protect against modification of the second key;

add additional second data to the second key to associate the second key with a second source;

add the first key and the second key to a key table;

apply confidentiality to the key table;

add third data to the key table to protect against modification of the key table at least one of storing the first key in a storage of a device when the first key is received or retrieving the first key from the storage of the device when the request to retrieve the first key is received, wherein the device is external to the chip; and store the key table having the first key and the second key in the storage of the first device;

controlling access to the first key stored in the storage of the device.

18. A circuit of a first device configured to:

receive at least one of a first key;

store the key in a storage of a second device when the key is received, wherein the second device is external to the first device;

a third circuit is configured to:

apply confidentiality to the first key;

add first data to the first key to protect against modification of the first key; and add second data to the first key to associate the first key with a source;

apply confidentiality to a second key;

add additional first data to the second key to protect against modification of the second key; and add additional second data to the second key to associate the second key with a second source; and the first circuit is further configured to:

add the first key and the second key to a key table;

apply confidentiality to the key table;

add third data to the key table to protect against modification of the key table;

store the key table having the first key and the second key in the storage of the first device; and control at least one of read access of the key in the storage of the second device or write access of the key to the storage of the second device.

* * * * *